UNITED STATES PATENT OFFICE.

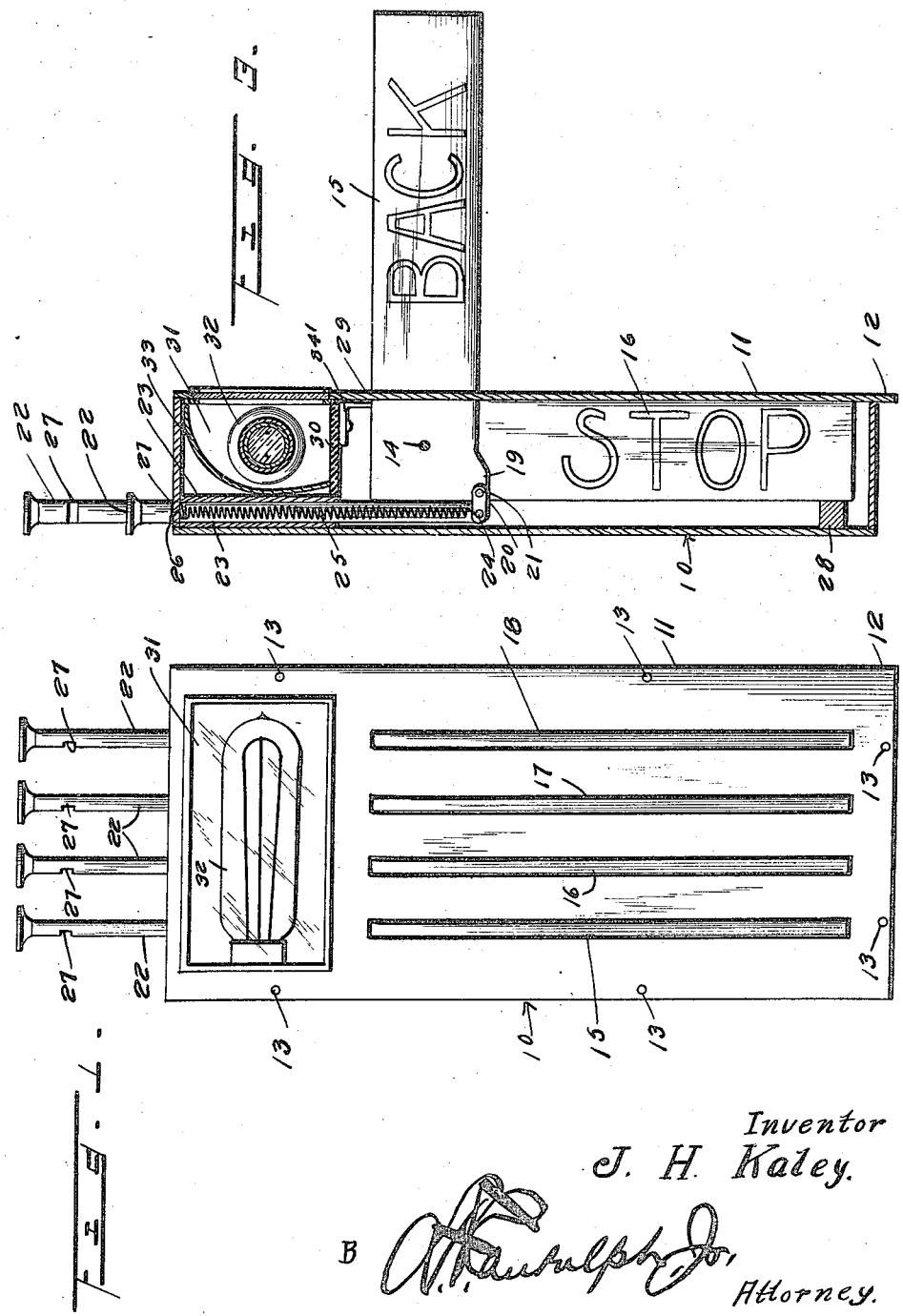

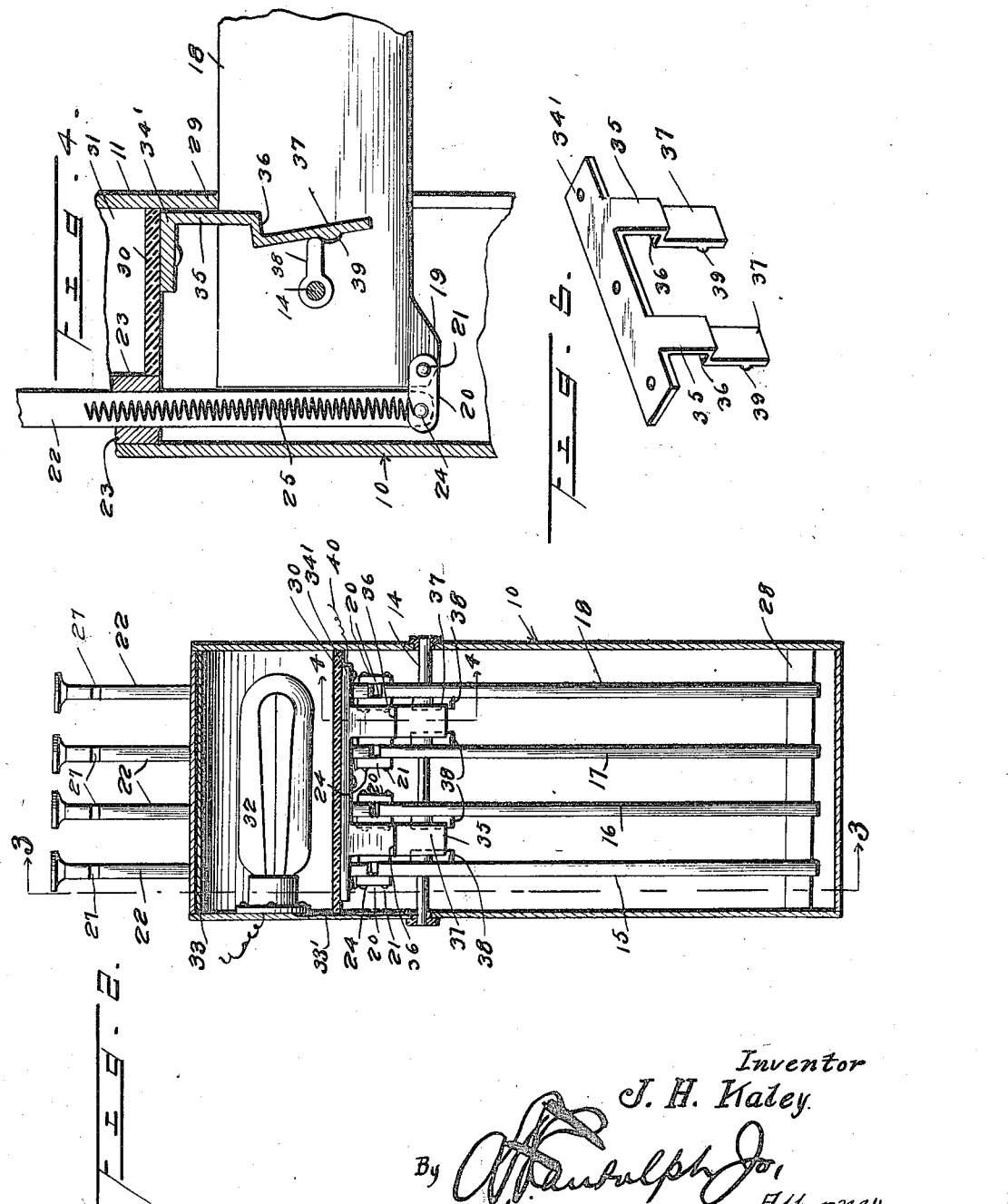

JOHN H. KALEY, OF SCHENECTADY, NEW YORK.

VEHICLE SIGNAL.

1,424,652.  Specification of Letters Patent.  Patented Aug. 1, 1922.

Application filed June 6, 1919. Serial No. 302,280.

*To all whom it may concern:*

Be it known that I, JOHN H. KALEY, a citizen of the United States, residing at Schenectady, in the county of Schenectady and State of New York, have invented certain new and useful Improvements in Vehicle Signals; and I do hereby declare the following to be a full, clear, and exact description of the invention, such as will enable others skilled in the art to which it appertains to make and use the same.

My invention relates to vehicle signals.

An important object of this invention is to provide a vehicle signal having novel means for actuating indicator arms adapted for advising pedestrians and the operators of other vehicles of the intended movement of the vehicle.

A further object of this invention is to provide novel means for automatically closing an electric circuit upon the movement of one of the indicator arms whereby the extended arm is illuminated upon being operated.

A further object of this invention is to provide a signal of the character described which is compact, neat in appearance and cheap to manufacture.

Other objects and advantages of the invention will be apparent during the course of the following description.

In the accompanying drawings forming a part of this application and in which like numerals are employed to designate like parts throughout the same, Figure 1 is a front elevation of a signal embodying my invention, Figure 2 is a central vertical section through the same, Figure 3 is a vertical transverse section taken on line 3—3 of Figure 2, Figure 4 is a similar view taken on line 4—4 of Figure 2, Figure 5 is a perspective of the stationary member of the switch.

In the drawings wherein for the purpose of illustration is shown the preferred embodiment of my invention, the numeral 10 designates a rectangular casing having its forward side 11 provided with attaching flanges 12. The casing 10 is adapted to be placed in the door adjacent the operator of the vehicle and is provided with suitable openings 13 for the reception of fastening devices.

As indicated in Figure 3, the casing is provided with a horizontal shaft 14 upon which is mounted a plurality of indicator arms 15, 16, 17 and 18. Each indicator arm is provided with a suitable inscription such as Left, Right, Stop, and Reverse. As illustrated in Figure 3 the indicator arms are pivoted to the shaft 14 at a point spaced from the upper ends and are provided with shoulders 19 at their upper end portions on their rear sides. Links 20 are pivoted to the shoulders as indicated at 21 and are arranged at the side of the arms. Actuating rods 22 are slidably arranged in guides 23 disposed in the rear upper portion of the casing. The lower ends of the actuating rods 22 are connected to the links 20 by pivot elements 24 and are disposed directly above the indicator arms. The links 20 also have connection with coil springs 25 having their upper ends connected to brackets 26. The coil springs 25 return the indicator arms to inoperative position immediately upon being released from signalling position. Notches 27 in the upper end portions of the actuating members 22 extend through openings in the top of the casing and engage the sides of said openings for locking the actuating members downwardly.

As illustrated in Figure 3, the indicator arms are limited in their rearward movement by a transverse trip or block 28 secured to the rear wall of the casing adjacent its lower side. The indicator arms are limited in their upward movement by depending extensions 29 carried by the front wall 11. Coincident with the engagement of the indicator arms with the depending extensions 29 the notches in the actuating members engage the top of the casing thereby retaining the indicator arms in a horizontal or operative position.

I have provided a horizontal partition 30 above the indicator members thereby providing a compartment 31 in which is arranged an electric light 32. A reflector 33 is arranged rearwardly of the electric light and is adapted to direct the light rays to the inscribed portions of the indicator arms. The electric light has connection with a suitable source of electrical energy and is controlled by a suitable switch whereby the same is lighted only at night.

To provide means for automatically completing the circuit to the electric light upon elevating one of the indicator arms, I have extended one of the feed wires 33' from the base of the electric light to the shaft 14. As indicated in Figure 4, I have attached a stationary switch member 34 to the underside of the partition 30, which incidentally is of an insulating material. The switch member 34 includes a pair of depending metallic spring arms 35 disposed between the opposed sides of the arms 15 and 16 and the arms 17 and 18. The flat spring arms 35 are provided with outwardly extending offset portions 36 which dispose the contact portions 37 inwardly from the front side of the casing. Metallic contact arms 38 are rigidly secured to the indicator arms and are rotatably mounted on the shaft 14 though electrically connected therewith. Upon the upward movement of the indicator arms, the contact arms 38 engage the lower portions of the leaf spring contacts 35. To insure a good electrical connection between the members 35 and 38, I have provided transversely extending abutments 39 on the contact portions of the springs 35. Upon the elevation of the indicator arms, the contacts 38 are held in engagement with the lower portions of the leaf springs 35 by the abutments 39.

As illustrated in Figure 2, one of the feed wires 40 is connected to the stationary switch member 34. To prevent the possibility of short circuit, I prefer to make the indicator arms of a nonconducting material.

In the use of my invention, the electric light is lighted slightly before the indicator arm reaches its uppermost position.

While I have shown and described the preferred embodiment of my invention, it is understood that I may make such minor changes in arrangement and construction of parts as will remain within the spirit of the invention and the scope of the appended claims.

Having thus described my invention, what I claim is:—

1. A signalling device having a signalling arm, a rod on which the arm is journalled, an actuating means eccentrically connected to the arm adjacent an upper corner thereof, means to urge the arm upwardly to a retracted position, and means to secure the arm in a projected position counter to said means automatically engageable with and releasable from said arm through movement afforded by the actuating means.

2. A signalling device having a signalling arm, means to pivotally mount the arm, a depressible actuating bar, a link pivoted to said bar and eccentrically pivoted to said arm adjacent an upper corner thereof, and the upper end of the arm being adapted to abut the same upon depression of the bar to limit projection of the signalling arm.

3. A signalling device having a signalling arm, a rod on which the arm is journalled, a depressible bar, a link pivoted to the bar, said link being eccentrically pivoted to the signalling arm adjacent an upper corner thereof, a spring associated with the bar and link to urge the signalling arm upwardly to a retracted position, the upper end of the signalling arm being movable toward and adapted to abut the bar upon projection of the signalling arm, a lug movable with the signalling arm, a latch means on the casing cooperating with said lug.

In testimony whereof I affix my signature in presence of two witnesses.

JOHN H. KALEY.

Witnesses:
  FLORENCE C. BENNIS,
  ADAM BOND.